US007469207B1

(12) United States Patent
Cohen et al.

(10) Patent No.: US 7,469,207 B1
(45) Date of Patent: Dec. 23, 2008

(54) METHOD AND SYSTEM FOR PROVIDING AUTOMATED AUDIBLE BACKCHANNEL RESPONSES

(75) Inventors: Harvey S. Cohen, Middletown, NJ (US); Kenneth H. Rosen, Middletown, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 508 days.

(21) Appl. No.: 11/144,154

(22) Filed: Jun. 3, 2005

Related U.S. Application Data

(63) Continuation of application No. 09/790,885, filed on Feb. 23, 2001, now Pat. No. 6,941,269.

(51) Int. Cl.
*G10L 15/00* (2006.01)

(52) U.S. Cl. .................... 704/215; 704/260; 379/88.18; 455/413

(58) Field of Classification Search ................. 704/215, 704/260; 379/88.18; 455/413
See application file for complete search history.

(56) References Cited

U.S. PATENT DOCUMENTS 4,328,396 A * 5/1982 Theis .......................... 379/71
5,440,615 A * 8/1995 Caccuro et al. .......... 379/88.06
5,524,139 A * 6/1996 Jones ...................... 379/88.25
5,544,229 A * 8/1996 Creswell et al. ......... 379/114.05
2006/0018446 A1 * 1/2006 Schmandt et al. ........ 379/88.17

* cited by examiner

*Primary Examiner*—Daniel D Abebe
(74) *Attorney, Agent, or Firm*—Michael Haynes PLC; Michael N. Haynes

(57) ABSTRACT

A voice processing system comprises a processing device that processes and receives a stream of voice input as a user is speaking. A software program executes program steps for determining a predetermined pattern of speech and silence during processing of stream of voice input so as to play or present the predetermined backchannel response to the user. A method provides an audible backchannel response between the voice processing system and the user, while the user is speaking, in particular, recording a message. The method includes monitoring the message to determine a predetermined pattern of speech and silence based on timing between the speech and silence periods. Then, the method produces the audible backchannel response based on the predetermined pattern. An audible user interface includes a speech processor that processes or classifies an audio message in the telecommunication device as speech and silence frame while a calling party is speaking, in particular, recording the audio message to a called party. A control circuitry cooperates with the speech processor and responds to a predetermined pattern of the speech and silence segments so as to play the preset backchannel response in audible form to the calling party.

33 Claims, 5 Drawing Sheets

METHOD AND SYSTEM FOR PROVIDING AUTOMATED AUDIBLE BACKCHANNEL RESPONSES

CROSS-REFERENCES TO RELATED APPLICATIONS

This application is a continuation of, claims priority to, and incorporates by reference herein in its entirety U.S. patent application Ser. No. 09/790,885, filed 23 Feb. 2001 now U.S. Pat. No. 6,941,269.

TECHNICAL FIELD

The present invention generally relates to the field of voice processing; and, more particularly, to a method and system for providing automated audible backchannel responses while a person is speaking to a voice recording or input device.

BACKGROUND OF THE INVENTION

The use of voice processing technology in both public and private telecommunication networks is widespread. The most familiar type of voice processing technology is a telephone system equipped with a voice mail system. In a voice mail system, an incoming caller is routed to a voice mailbox associated with a particular person or department. The particular owner of the voice mailbox may not be available to speak immediately to the caller. The caller is then invited to leave or record a message on the system in a similar fashion to telephone answering machines. Many callers would rather speak to a live person than a computerized machine and some callers avoid leaving a message. At least some of these persons find speaking to a voice messaging system an unpleasant experience, in-part, because the voice messaging system may not give responsive feedback during the recording session. This responsive feedback is generally denoted as audible backchannel responses, such as, “mm-hummm”, “O.K.”, “yeah”, “iuh-huh”, or “yes”. These backchannel responses generally are what a human listener normally says while listening to another person speaking.

The purpose of backchannel responses is to make the speaker feel more natural and comfortable during speech. These audible backchannel responses are generally utterances during a conversation that signifies to the speaker that the listener has understood what the speaker spoke. In particular, when one person is recording a spoken message on an automated recording device for delivery to another there are no backchannel responses provided to the person. Without backchannel responses, the speaker generally becomes less efficient in communication and uncomfortable. Thus, a spoken message recorded on the automated recording device, such as a voice mail system, may be longer and sometimes difficult to understand.

Research has shown that people speaking on the telephone while leaving a message tend, to repeat themselves and use more words to convey the same information when they do not hear backchannel responses. This additional message length tends to cause a storage medium, such as a hard disk drive, of voice messaging systems to become full. Telecommunication managers must spend additional labor resources to clean the system storage, purchase additional storage capacity, or force the voice mailbox owner to delete messages. This can increase the operating cost of using voice messaging systems in terms of additional labor hours and out-of-pocket capital equipment expenditures. Therefore, if the length of messages can be shortened, the storage space and money can be saved.

Conventional voice processing systems do not provide automated backchannel responses keyed to the caller while the caller is speaking, in particular, recording or dictating a message. Voice messaging systems only record a message by allowing the caller to speak first. The current available voice messaging systems play pre-recorded messages or voice prompts to the caller, at the end of the speaker's message or post recording. After the caller finishes the recorded message, the voice mail or processing system or automated attendant tells the caller what to do for navigating in the system. Further interactive voice response (“IVR”) systems do not provide automated backchannel responses. Conventional IVR systems generally perform an action upon receiving an audible voice command or telephone keypad input. The audible voice command takes the place of keyboard input. Some IVR systems provide audible information, such as stock quotes or banking account information. IVR provide conversational responses by either waiting for the end of a voice command to perform an action or to play pre-recorded information. Again the voice commands are post processing. Some voice mail systems or IVR systems prompt the user by alerting or beeping the user to a time limit for the message. This alerting or beeping is not a backchannel response based on the speech and silence pattern in the voice of the user.

There has been some research in the area of backchannel responses. For example, the authors Ward and Tsukahara in *Prosodic Features which Cue Back-Channel Responses In English and Japanese, Journal of Pragmatics, Volume* 32, *Issue* 8, 2000 discloses research that focuses on the changes in sound or pitch in the speaker's voice to determine when to produce a backchannel response. This research discloses focusing on prosodic cues in which to trigger a backchannel response. There must be software to determine the syntactic cues in a person speech. There is no disclosure of a voice processing system that uses the pattern of speech and non-speech to determine when to produce a backchannel response for a user.

Voice transcription devices are known in the art. Some are hand-held devices and computer based systems as disclosed in U.S. Pat. No. 5,197,052 to Schroder et al. and U.S. Pat. No. 6,122,614 to Kahn et al. Some transcription devices convert speech-to-text using speech-recognition software. Conventional voice transcription devices lack the ability to facilitate the dictation process by providing automated backchannel responses based on the speech pattern of a user.

As both consumers and businesses are flooded with electronic messages in various media types, the ability to process these messages efficiently becomes more valuable. Thus, what is needed is a system and method of providing audible backchannel responses in voice processing systems without the aforementioned drawbacks of conventional voice processing technology. In particular, what is needed is a voice messaging system that treats the problem at the source, by influencing the caller or speaker to leave a shorter message for more efficient voice messages. Also what is needed is a voice recording/messaging system that simulates a human listener.

SUMMARY OF THE INVENTION

In view of the foregoing, the present invention is directed to a system and method of providing an audible backchannel response to a user that overcomes the problems in the prior art.

In an embodiment of the present invention, a voice processing system comprises a processing device that receives and processes a stream of voice input as a user is speaking. A storage device is included in the voice processing system that stores the processed voice input and other data in computer readable code. A predetermined backchannel response is held in the storage device for later use. The present invention further includes a software program that executes or operates with the processing device. The software program executes program steps for determining a predetermined pattern of speech and non-speech during processing of the voice stream input so as to play or present the predetermined backchannel response to the user. In this way, one advantage includes a voice processing or voice messaging-system which can process voice data more efficiently.

In another embodiment of the present invention, a method provides an audible backchannel response between the voice processing system and the user, while the user is speaking, in particular, recording a message. The method includes monitoring the message to determine a predetermined pattern of speech and silence based on timing between the speech and silence periods. Then, the method produces the audible backchannel response based on the predetermined pattern. Further steps of the method include monitoring the message for a period of speech to determine an elapsed time of speech and monitoring the message for a period of non-speech for determining an elapsed time of non-speech. Also, the elapsed time of speech is compared to a predetermined time period of speech, and the elapsed period of non-speech is compared to a predetermined time period of non-speech. In this way, one advantage includes the audible backchannel response being played while a user is speaking so as to provide natural conditions for composing a message to a computerized device.

In another aspect of the present invention, an audible user interface for a telecommunication device is provided. The audible user interface includes, a speech processor that processes or classifies an audio message in the telecommunication device as speech and silence frame while a calling party is speaking, in particular, recording the audio message to a called party. The user interface includes a preset backchannel response located in a memory. In addition, a control circuitry cooperates with the speech processor and responds to a predetermined pattern of the speech and silence segments so as to play the preset backchannel response in audible form to the calling party. In this way, one advantage includes providing realistically simulated backchannel responses to make the calling party feel more natural and comfortable by simulating a human listener.

These and other objects, features and advantages of the present invention will be apparent upon consideration of the following detailed description thereof, presented in connection with the following drawings in, which like reference numerals identify the elements throughout.

DETAILED DESCRIPTION OF THE INVENTION

Figure 1:
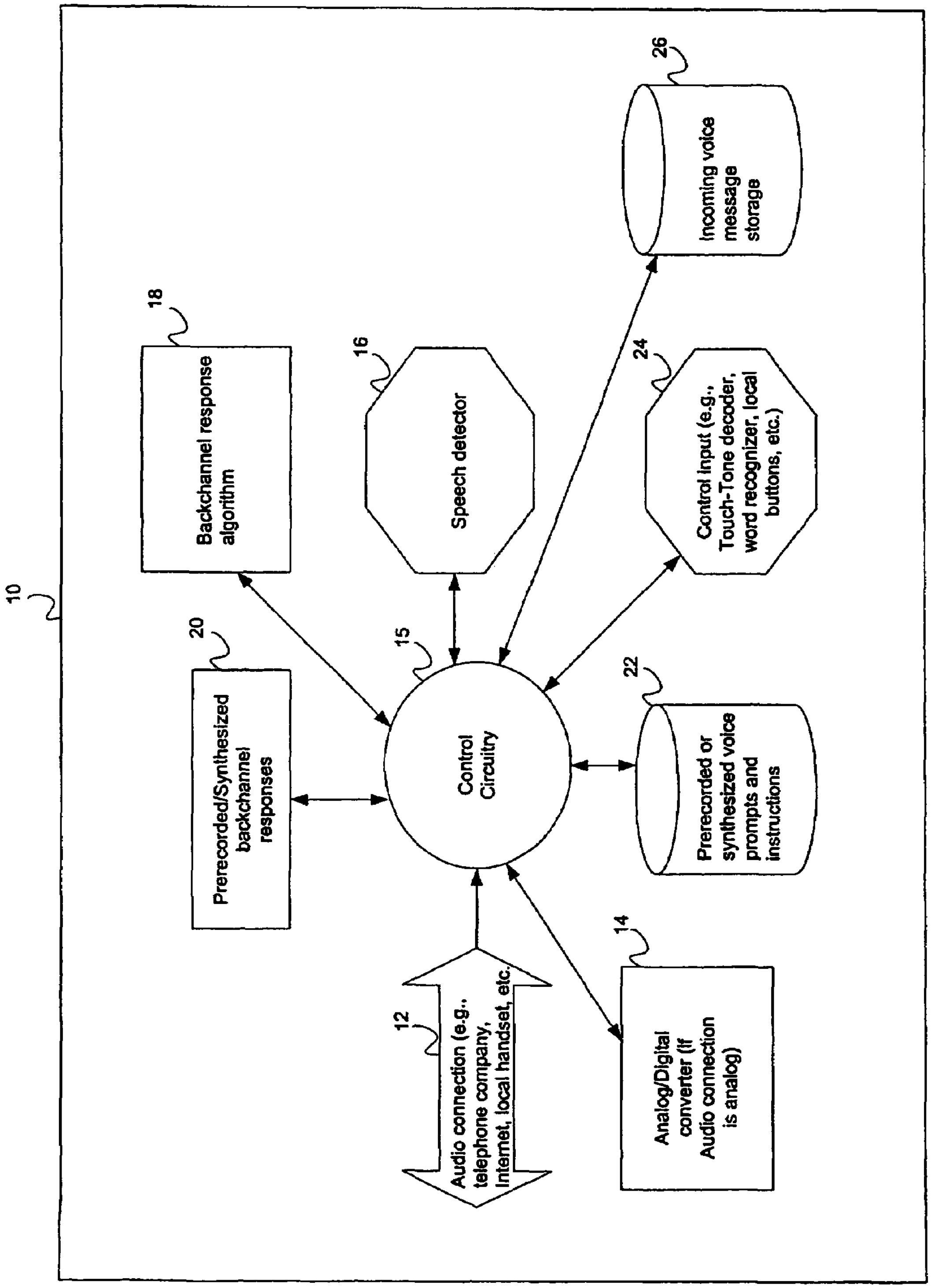
FIG. 1 is a schematic diagram of an embodiment of a voice messaging system.

There is shown in FIGS. 1-5 an illustration of embodiments of the present invention, a system and method for processing the voice of a user to provide automated backchannel responses. The system and method uses a predetermined pattern of speech and non-speech in an audible message that causes the system of the present invention to produce an audible backchannel response. In an embodiment, one system is generally referred to herein as a voice processing system and is designated as reference numeral 10.

FIG. 1 is a schematic diagram of an environment in which voice processing system 10 of present invention may be implemented. Voice processing system 10 can comprises some or all subcomponents such as, an audio connection 12, a control circuitry 15, an analog/digital converter 14, a speech detector 16, a backchannel response application program 18, backchannel responses 20, prerecorded voice prompts 22, a control-input 24, and a voice message storage medium 26. It should be noted that the components are exemplary; more or less may be in the voice processing system, and each of these components are described in detail herein.

Audio connection 12 comprises hardware and software to receive an audible voice from a telephone handset, a microphone, a public telecommunications network, the Internet or any network. The analog/digital converter 14 is operatively coupled or wired to the audio connection 12. The analog/digital converter 14 receives analog voice signals and transforms the signals into digital data. The transformation of voice signals into a digital data can be accomplished in a number of ways. For example, the voice signals may be sampled by using pulse code modulation. Analog/digital converter 14 includes a digital signal processor, a CODEC, and related circuitry.

Control circuitry 15 includes electronic hardware and software provided for execution of program steps in computer readable code. Control circuitry 15 has software that performs arithmetic and logical functions, including programs for operational control of the various components of the system. Control circuitry 15 is operatively coupled to the analog/digital converter, speech detector 16, backchannel response application program 18, backchannel responses 20, prerecorded voice prompts 22, control-input 24, and voice message storage medium 26. This coupling is accomplished via wiring and functional commands with operating systems. Control circuitry 15 may include a specific purpose microprocessor, such as for processing voice input for a user. A speaker or user produces a stream of voice input that is composed of a successive plurality of phonemes.

Speech detector 16 comprises hardware and software that classifies incoming audio data via the audio connection 12 as speech or silence. Speech detector 16 may be configured to provide a sound energy level of the incoming voice data in which a level below a pre-determined threshold level is classified as silence. The term "silence" being defined herein as non-speech or alternatively stated the absence of speech. In the embodiments illustrated, while a user is speaking or producing a plurality of phonemes, a pause by the user may be interpreted or processed as silence (e.g. non-speech or absence of speech). It is recognized that the voice data can contain may different types of sounds or patterns of sounds. These patterns and types of sounds can be separated into classes of sound types, such as speech, or non-speech. The speech detector with the appropriate software can determine or recognize voice input that is speech, non-speech, or speech with background noise.

Speech detector 16 is operatively coupled to analog/digital converter 14 and related circuitry. Speech detector 16 may be supplied with existing voice computer telephony printed circuit boards with interfacing driver software. The printed circuit board hardware is configured to report sound data to the driver software. The speech detector may be embodied in a voice modem such as MODEM BLASTER® PCI manufactured by CREATIVE TECHNOLOGY, LTD, using a MICROSOFT® Telephone application Programming Interface (TAPI) and Sound Application Programming Interface (SAPI); computer telephony cards, such as, Dialogic® D/41ESC™, D/160SC-LS™, Proline/2V™, or DM/V1200-4E1™ using SPRINGWARE™ Software and corresponding Software Development Kit (SDK).

Backchannel response program 18 is an application program including executable steps that receives data from the speech detector 16 so as to determine a predetermined pattern of speech and silence segments in the audio input. Based on the predetermined pattern, backchannel response program 18 provides commands to play a backchannel response 20 to user. This method will be described in detail below. The backchannel response program 18 can embody a computer program product in a computer usable medium, such as a floppy drive, optical disk, magnetic hardware drive, programmable memory, or any other device that stores digital data for processing. The computer usable medium includes computer readable code that causes a computer to execute a series of steps. The computer readable code may be stored on a server connected to a public switched telecommunications network, such as the Internet including the World Wide Web. This allows backchannel response program 18 to be transmitted via a carrier wave to be downloaded to a destination client such as a personal computer or a voice mail server. In an alternative embodiment, application program 18 may be embodied in firmware such as application specified integrated circuits ("ASIC"). The ASIC enables the backchannel response program to be included in voice transcription devices like digital recorders, or included on computer telephony printed circuit boards.

Backchannel responses 20 are embodied in the various computerized audio responses selectively stored on a computer usable storage medium, such as a hard disk, optical disk, floppy disk, programmable memory, or any other device that stores digital data for processing. The backchannel responses are produced by a speech synthesis mechanism in which the system 10 generates sounds by splicing together prerecorded words. In addition, speech synthesis is generated by programming circuitry 15 to produce audible sounds that make up the spoken words. The backchannel responses can be embodied in any appropriate digital encoded files, such as waveform audio format ("WAV") or formats used on the Internet and the World Wide Web.

These prerecorded responses are phrases that may be any appropriate backchannel response, while not an exhaustive list some examples include "mm-hummm", "O.K.", "yeah", "uh-huh", "yes", "right", "good", "go on", "got it", "ah", "nah", "got it", "alright", "okie dokie", "you don't say", or "go ahead". In another embodiment, the backchannel responses can be various catch phrases, slogans, or portions thereof. A catch phrase generally relates to popular culture. A catch phrase is a word or words made popular through the media such as television, radio, motion pictures, Internet, advertising, or music video. Some examples of catch phrases include "oh boy", "I'am here", "works for me", or "I heard that". Some catch phrases generally have value for media companies similar to trademarks. While these recorded messages are in the English language, the present invention is not so limited, the backchannel responses may be applied to other languages that have a speech structure similar to English, such as Spanish.

For additional comfort to the speaker or caller, an embodiment enables a designated owner of a voice mailbox to record or sample the backchannel responses in their own unique voice. In another embodiment, the system provides for the designated owner of the mailbox to record a voice imprint having the tonal characteristics of their voice. This advantageously provides for the system to synthesize other voices. For example, the owner of the mailbox or system may want the caller or speaker to hear a backchannel response in the voice of a famous person. This adds additional comfort to the speaker or caller. In addition, the system provides for the voice imprints to be adjusted by a digital sound manipulation device, such as provided on voice modem printed circuit boards. An exemplary method of recording the backchannel responses will be described in the foregoing.

Similar to backchannel response program 18, backchannel responses 20 can be embodied in a carrier wave to be transported via an electronic signal, such as network transport. This enables backchannel responses 20 to be transmitted via the carrier wave for download to a destination client such as a personal computer or a voice mail server. Equally, backchannel responses 20 may be uploaded from a client to a server or a network. In an alternative embodiment, backchannel response program 18 may be embodied in read only memory or erasable programmable memory such as flash memory. This enables backchannel responses 20 to be included in digital recorders, computer telephony printed circuit boards or with other devices for recording a voice message that includes microprocessor.

Referring to FIG. 1, prerecorded or synthesized voice prompts 22 are the part of voice processing system 10 that instructs the caller or user how to access the system. In the exemplary embodiment, the caller is presented with a hierarchical menu of options by the system 10. Each menu option is logically mapped to a specific action or command executed by the voice processing system 10. Voice prompts 22 are similar to menu commands found in conventional voice mail systems.

Another component of the present invention is the control input 24. Control input 24 comprises hardware and software for controlling and directing the system 10. For example, control input 24 can be any form of input that a general voice messaging system uses such as a dual tone multi-frequency ("DTMF") signal (touch-tone), a code word recognizer, a keyboard input, or a mouse-click. Control input 24 and voice prompts 22 operated in conjunction so that a caller or user can navigate the menus and use the voice processing system 10.

The incoming audio of voice messages by the caller is stored on a voice message storage unit ("VMSU") 26. Voice processing system 10 of the present invention converts the analog audio voice messages from the caller into digital format by analog digital recorded 14. VMSU 26 selectively stores the voice messages on a computer usable storage medium, such as a hard disk drive, or floppy drive. The drives and their associated computer-readable media provide non-volatile storage of computer readable instructions, data structures, program modules and other data for system 10. Although the processing system described herein employs a hard disk drive or floppy disk, it should be appreciated by those skilled in the art that other types of computer readable media which can store data that is accessible by a voice processing system, such as magnetic cassettes, flash memory cards, random access memories ("RAMs"), read only memories ("ROMs"), and the like, may also be used in the processing system.

In use, during the recording of the voice message from the caller, the voice message is recorded and stored in real-time. The caller will hear the backchannel responses in an output speaker on a telephone handset or through standalone speakers, but the system generated backchannel responses 20 will not be recorded while the caller is recording a message.

Other features of the present invention can include a speech segmented device that filters music and noise on the audio connection to classify the speech and non-speech accordingly. One such as method of filtering is described in U.S. Pat. No. 6,067,517, which is herein fully incorporated by reference. In addition, a front end process for identifying the language of a speaker and various corresponding dialects may be implemented. In one embodiment, a method includes prompting a user to provide their specific language and/or dialect of use. In another embodiment, a language identification method uses a computational linguistical method with a parser.

Figure 2:
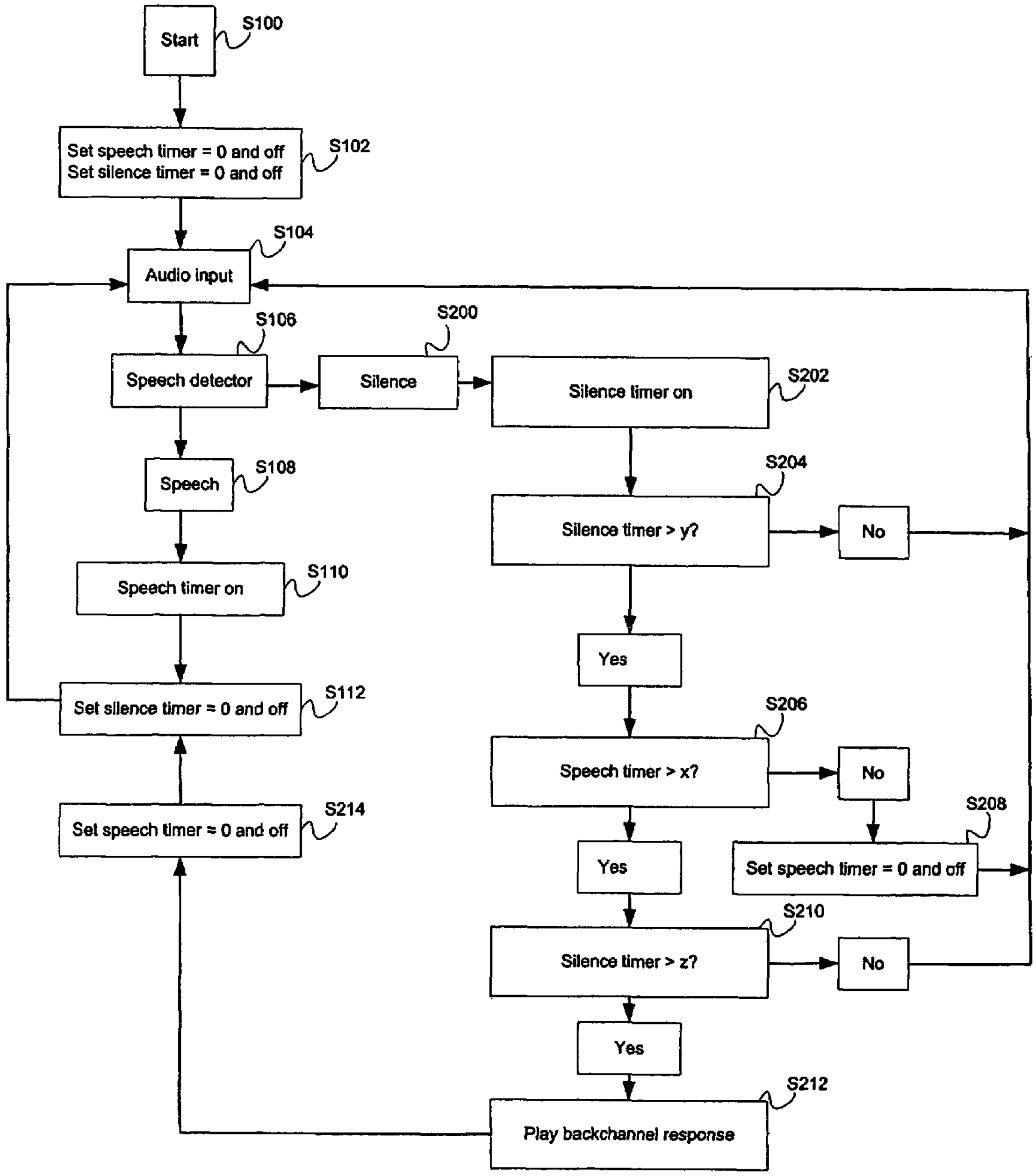
FIG. 2 is a flow chart of an embodiment of a method producing a backchannel response.

Referring to FIG. 2, a flow chart illustrates a method of an embodiment of the present invention. The foregoing method may be embodied in backchannel response application program 18. This method of the present invention can be also embodied in software instruction language such as C, C++ or others. Then, this software instruction can be complied in computer readable code. In use, an exemplary backchannel response is produced when the method determines a pattern of speech and silence such that five or more seconds of speech intermixed with periods of silence of less than one-half second is followed by one-half second of continuous silence. "Silence" being defined as non-speech in that the speaker has temporarily stopped talking, as in pausing.

When the voice processing system prompts the speaker to leave a message, at step S100 and S102, the system is initialized in which a speech timer and a silence timer are set off and reset to zero milliseconds. The speech and silence timers are program steps that count sequential increments of time. The timers are preferably turned off/on and reset by function commands in software. The timers preferably count time in milliseconds, but other measurement of time can be implemented, such as seconds.

As shown in step S104, the system 10 receives audio input from the caller. Step S104, also includes the system 10 recording the caller. In other embodiments of the invention, the caller or user's voice is not recorded. While the system 10 is recording a spoken message of the caller or user, at step S106, the speech detector 16 monitors or classifies the voice stream input as either speech input or as silence, each classification is described in detail herein. If speech detector 16 determines the input as the speech, that is the caller is still talking, then at step S108, a speech indicator is set and at step S110 the speech timer is started. Next, as shown in step S112, the silence timer is reset to zero and turned off.

Now referring to step S106, if speech detector 16 classifies the voice stream input as silence, that is, the caller has paused speaking during the recording, then at step S202, the silence indicator is set. Next, at step S202, the silence timer is started so as to measure the elapsed period of silence. At step S204, the elapsed period of silence is compared to a predetermined silence variable X. Silence variable X is preferably equivalent to 500 milliseconds or one-half seconds. If the elapsed period of silence is less than silence variable X, the control is transferred to step S104 for processing additional audio voice stream input. If during the comparison step of S204, the elapsed period of silence is greater than predetermined silence variable X, the control is transferred to step S206.

As shown in step S206, the time period of speech is compared to a predetermined speech variable Y. Predetermined speech variable Y is preferably equivalent to 5000 milliseconds or equivalently five seconds of speech input. If the elapsed period of speech is not greater than predetermined speech variable Y, then control is transferred to step S208. At step S208 the speech timer is reset to zero and control execution is then transferred to step S104 to again receive audio input. If, however, the elapsed time period of speech is greater than predetermined speech variable Y in the comparison step S206, the control execution is transferred to step S210.

At step S210, a second comparison of the elapsed period of silence is performed in which the period is compared to a second predetermined silence variable Z. If the elapsed period of silence is less than second silence variable Z, then control is transferred to step S104 for receiving additional audio input. If the elapsed period of silence is greater than second silence variable Z, control is transferred to step S212.

As shown in step S212, the system 10 is responsive and plays a backchannel response to the caller or user. When the embodiment of the present invention is applied in the voice processing system 10, backchannel responses 20 are played to the caller or user via a handset speaker or other audio playback device. In addition, system 10 can be configured to play only a specific designated backchannel response that is pre-selected by the mailbox owner, such as "uh-uh". Alternatively, system 10 can be configured to play out a randomly selected backchannel response from backchannel responses 20 when requested by the method of the present invention. The caller or user will hear a different backchannel response, which enables the system 10 to make the user interface more natural as in speech with a human listener. The randomly generated backchannel responses also enable the present invention to more simulate a human listener.

After the backchannel response is played, control is transferred to steps S214, S112, and S104 in which the speech and silence timers are reset and the system 10 receives audio input. The method of the present invention shown in FIG. 2 then is executed in sequence as explained in the foregoing. It should be noted that the predetermined silence, speech, and second silence variables are not limited to the values of 500, 5000, and 500 millisecond respectively. These values can be adjusted or slightly tuned to meet the specific characteristics of speech detector 16 or language of selection.

Figure 3:
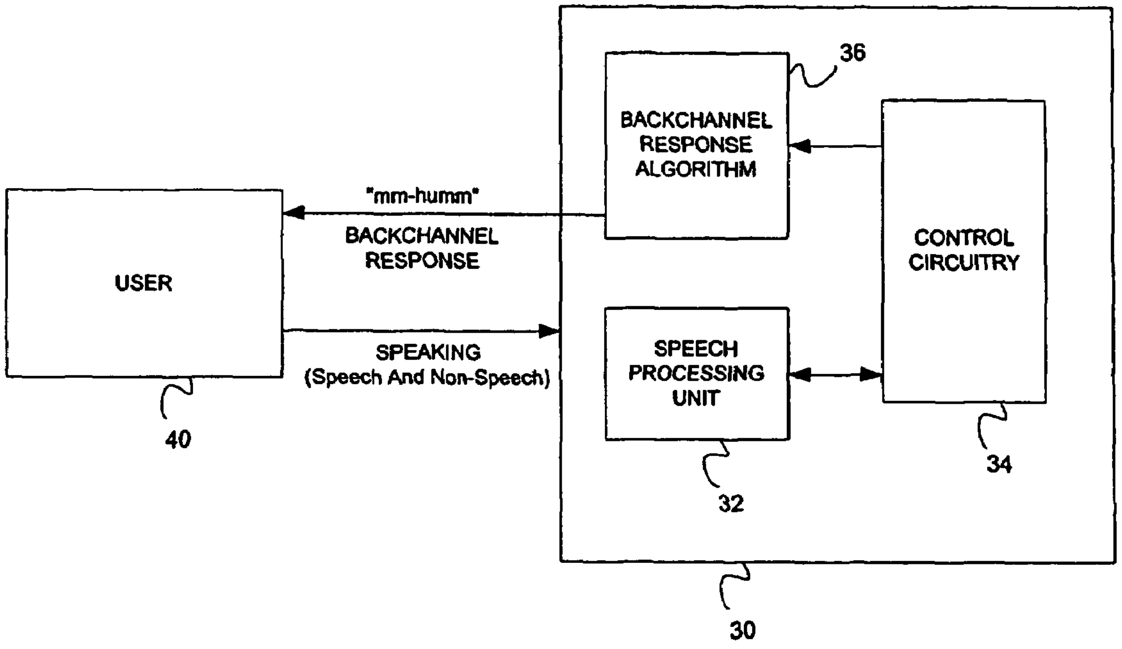
FIG. 3 is a schematic diagram of an embodiment of an audible user interface for using a telecommunications device.

FIG. 3 illustrates an embodiment of an audible user interface 30 for using a telecommunications device according to the present invention. In general, an audible user interface deals with human to machine interaction such that people function in relation to telephony devices and how to make input easy, comfortable, and efficient to use. In this embodiment, user interface 30 comprises at least three components—a speech processing unit 32, a control circuitry 34, and a preset backchannel response 36. Speech processing unit 32 processes or samples an audio message in a telephone device as speech and silence frames while a calling party 40 is recording the audio message to a called party. Speech processing unit 32 may be part of a general purpose microprocessor unit or part of related circuitry. Preset backchannel response 36 is similar to predetermined backchannel response 20. Preset backchannel response 36 is located in a memory for use with control circuitry 34. Control circuitry 34 performs or executes the steps of the previously described method of providing backchannel responses. Control circuitry 34 is operatively coupled to speech processing unit 32. In particular, the control circuitry is responsive to a predetermined pattern or relationship of the speech and silence frames and generates the preset backchannel response in audible form to the calling party 40. As shown in FIG. 3, the exemplary backchannel response created is "mm-hummm." Nevertheless, previously described backchannel responses may be used in this embodiment. Thus, the audible user interface makes the calling party 40 or user more comfortable in speaking the message and influences a shorter audio message.

Figure 4:
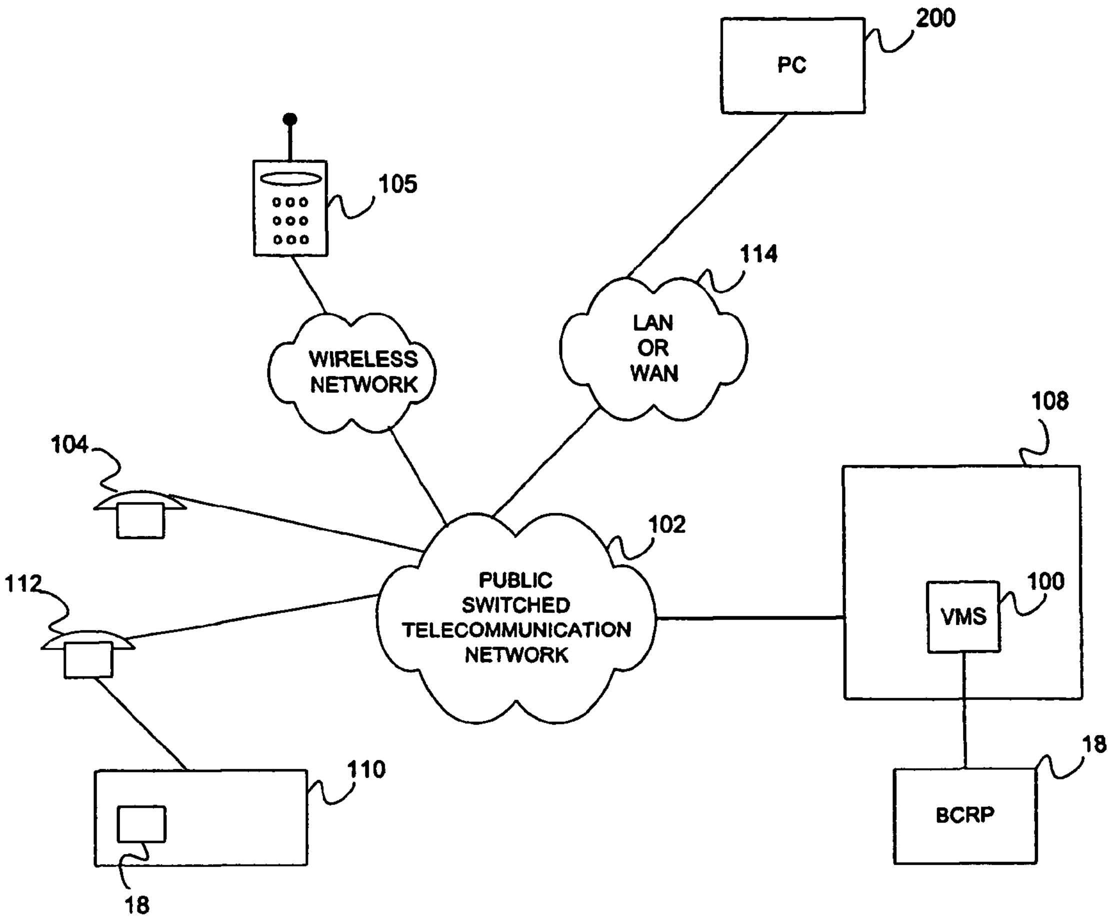
FIG. 4 is a schematic diagram of an embodiment of present invention in a telecommunications network environment.

FIG. 4 illustrates a telecommunications network environment where the present invention can be implemented. In this environment, voice processing system 10 embodies a voice mail system 100. Voice mail system 100 can be included in a public switched telecommunication network 102 as part of a voice mail service for localize telephone service, specialized voice mail services, a telephone central office, or even as part of a wireless telephone network, such as the AT&T Corporation wireless services. It will be appreciated that the network connections shown are exemplary and other means of establishing a communications links may be used.

A user or calling party may initiate a call a second person or a called party on telephone devices 104, 105. This call is connected to another telephony device 106 via public switched telecommunications network 102. A call processing system 108 may be a private branch exchange, or local exchange switch, which includes voice mail system 100 operatively connected thereto. A user of devices 104, 105 will receive prompting from voice mail system 100 via public switched telecommunications network 102. Because backchannel response program 18 is part of voice mail system 100, the user will hear audible backchannel responses in accordance with the present invention.

Alternatively, the backchannel response program 18 could be included in an environment of a digital answering machine 110 or similar telephony device. Here, a user could make a call with device 104 and connect to telephone device 112. Answering machine 110 would run or execute the backchannel response program 18 to provide responses to the caller.

The present invention also may be implemented within an environment of a general purpose computing device in the form of a conventional personal computer 200, including a central processing unit, a system memory, and a system bus that couples various system components including the system memory to the central processing unit. The system bus may be any of several types of bus structures including a memory bus or memory controller, a peripheral bus, and a local bus using any of a variety of bus architectures. The general purpose computing device may have an exemplary operating system such as MICROSOFT WINDOWS®, PALM OS, MICROSOFT WINDOWS CE®. The system memory includes read only memory ("ROM") and random access memory ("RAM"). In this arrangement, the user can provide an audible electronic message for sending to a distal source. Such software is available under a unified electronic messaging configuration. Backchannel response program 18 is executed in the computer processing unit, in which when the user desires to dictate a message, predetermined backchannel responses are produced in accordance with the method of the present invention. The general purpose computer device is not limited to a personal computer, but can embodied in be a personal digital assistant that runs dictation software or may have an audible electronic mail capabilities.

Also, the personal computer may operate in a networked environment 114 using logical connections to one or more remote devices. A remote device may be another personal computer, a telephone, a server, a router, a network PC, a peer device or other common network node, and typically includes many or all of the elements described above relative to the personal computer 200. The logical connections include a local area network (LAN) and a wide area network (WAN), such AT&T Corporation World Net Service. Such networking environments are commonplace in offices, enterprise-wide computer networks, intranets and the Internet.

Figure 5:
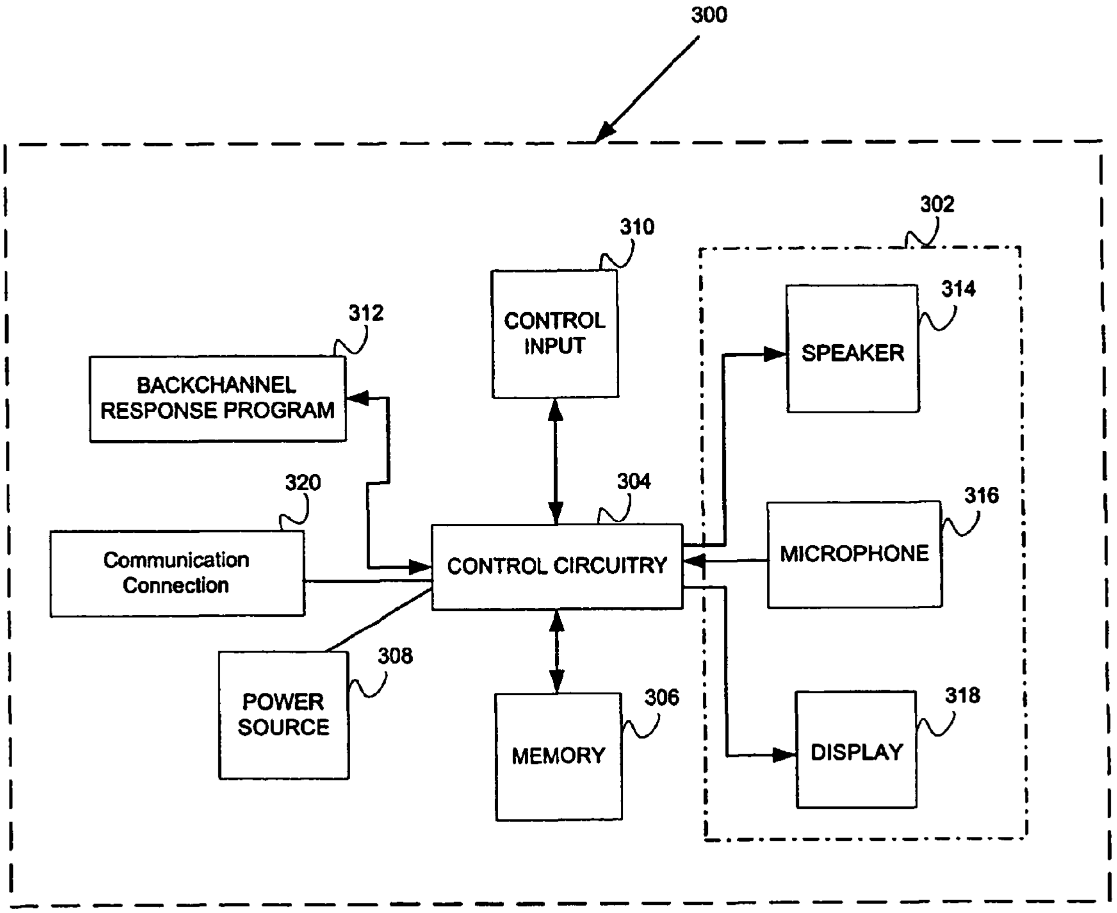
FIG. 5 is a block diagram of an embodiment of a transcription system.

Referring to FIG. 5, an embodiment of a voice transcription system 300 is illustrated. While a user is speaking or dictating to voice transcription system 300, backchannel responses are provided to the user as previously described. Voice transcription system 300 analyzes the speech of a user in real time and procures a string of text. This is similar to speech-to-text technology. System 300 need not record an audio representation of the voice of the user. In another embodiment, system 300 stores speech data in which those features of the speech needed for later analysis can produce text by a suitably equipped computer. The speech data is downloaded to the computer for analysis and transcription. System 300 may be embodied in a handheld or palm-size device.

Voice transcription system 300 includes electronic components and software such as a user interface 302, a control circuitry 304, a memory 306, power source 308, control input 310, backchannel response program 312. The user interface 302 provides audio and visual signals to a user of system 300. The user interface 302 includes a speaker device 314, a microphone device 316, and a display device 318. Control circuitry 304 includes hardware and instructions that performs arithmetic and logical functions, including programs for operational control of the various components of the system. Control input 310 comprises hardware and software for controlling and directing the system, such as a keyboard, or buttons. The speaker device 314 provides audible signals to the user of system 300. Microphone device 316 receives audio input from the user and converts the signals into the appropriate format for the control circuitry 304 to use the signals. Display device 318 provides visual signals to the user in the form of alphanumeric characters, colors or graphical symbols. The display device may be any well known display device, such as a liquid crystal display. The power source 308 provides the electric power to operate voice transcription system components and functions. A communications connection 320 may be included with system 300 to connect to personal computer 200, or network 102, 114. A housing encloses the aforementioned internal components of the voice transcription system. Backchannel response program 312 is similar to backchannel response program 18 and implements the same steps.

In other embodiments of the invention, backchannel response program can be included in a video telephone, and/or video conference system where a user leaves a video message, television or any set-up box type of device that a user can speak by leaving a message or dictation.

Thus, what has been described is a system and method of providing and audible backchannel response to a user. While these particular embodiments of the invention have been shown and described, it is recognized that various modifications thereof will occur to those skilled in the art. Therefore, the scope of the herein-described invention shall be limited solely by the claims appended hereto.

What is claimed is:

1. A voice processing system, comprising:

a processing device for processing a voice stream input from a user;

a predetermined backchannel response produced by a speech synthesis mechanism and stored in a digitally encoded file; and a software program, cooperating with the processing device, for identifying a temporal pattern of speech and non-speech time intervals of said voice stream input so as to generate the predetermined backchannel response to the user, wherein the predetermined backchannel response is a catch phrase.

2. The system of claim 1, further comprising a connection to a telecommunications network.

3. The system of claim 1, wherein the software program further comprises the steps of:

monitoring the voice stream input for a period of speech for determining an elapsed time of speech;

monitoring the voice stream input for a period of non-speech for determining an elapsed time of non-speech;

comparing the elapsed time of speech to a predetermined time period of speech; and comparing the elapsed period of non-speech to a predetermined time period of nonspeech.

4. The system of claim 1, further comprising comparing an elapsed period of non-speech to a predetermined time period of nonspeech.

5. The system of claim 1, wherein the voice stream input is in the English language.

6. The system of claim 1, further comprising a plurality of predetermined backchannel responses.

7. The system of claim 1, further comprising a language selection program via a computational linguistical method.

8. The system of claim 7, wherein the language selection program includes a dialect selection program.

9. The system of claim 1, wherein voice processing system is selected from a group comprised of a computer, a voice mail system, a voice transcription device, and a personal digital assistant.

10. The system of claim 1, wherein the predetermined backchannel response is an English language catch phrase.

11. The system of claim 1, wherein the voice stream input is processed in the Spanish language.

12. A method for providing an audible backchannel response between a voice processing system and a user, while the user is speaking a message, comprising:

monitoring the message to identify a temporal pattern of speech and non-speech time intervals based on timing therebetween; and producing a backchannel response based on the identified temporal pattern of speech and non-speech time intervals, the backchannel response produced by a speech synthesis mechanism and stored in a digitally encoded file, wherein the predetermined backchannel response is a catch phrase.

13. The method of claim 12, further comprising the step of classifying a period of speech during the speaking thereof.

14. The method of claim 13, further comprising the step of initiating a first timer to measure the period of speech.

15. The method of claim 12, further comprising the step of classifying a period of non-speech during the speaking thereof.

16. The method of claim 15, further comprising the step of initiating a second timer to measure the period of non-speech.

17. The method of claim 16, further comprising the step of comparing the measured period of non-speech to a predetermined time period of non-speech.

18. The method of claim 17, further comprising the step of comparing the measured period of speech to a predetermined time period of speech.

19. The method of claim 18, further comprising the step of randomly selecting the backchannel response from a plurality of predetermined responses prior to the step of producing.

20. The method of claim 19, further comprising the step of resetting the first and second timers to a predetermined base-time respectively.

21. The method of claim 12, wherein the voice processing system is located in a telecommunications network.

22. The method of claim 12, further comprising the step of identifying the language of the user using a computational linguistical method.

23. The method of claim 12, wherein the voice processing system is a voice mail system.

24. The method of claim 12, wherein the voice processing system is a voice transcription device.

25. An audible user interface for a telecommunication device, comprising:

a speech processor for processing an audio message from a calling party in the telecommunication device as a temporal pattern of speech and silence frames while said audio message is recorded to a called party; and a control circuitry being responsive to a said temporal pattern of speech and silence frames for generating a preset backchannel response in audible form to the calling party, the preset backchannel response produced by a speech synthesis mechanism and stored in a digitally encoded file, wherein the predetermined backchannel response is a catch phrase.

26. The user interface of claim 25, wherein the control circuitry includes a timer for determining a time period of the speech frame and a time period of the silence frame.

27. The user interface of claim 26, wherein the control circuitry responsively compares the respective time periods of the speech and silence frames to the predetermined the pattern of the speech and silence frames.

28. The user interface of claim 27, wherein the predetermined pattern of speech and silence time period is at least five seconds of speech intermixed with less than one-half second of silence followed by at least one-half second of silence.

29. A computer program product comprising:

a computer usable medium having computer readable code embodied therein for a causing a computer to process audio input from a user so as to produce a backchannel response, wherein the backchannel response is produced by a speech synthesis mechanism and is stored in a digitally encoded file the computer program product comprising:

computer readable program code configured to cause the computer to monitor the audio input for portions of speech and non-speech to identify a temporal pattern of speech and non-speech time intervals of said audio input;

computer readable program code configured to cause the computer to execute the backchannel response when the temporal pattern of speech and non-speech time intervals of said audio input are substantially similar to a predetermined temporal pattern of speech and non-speech time intervals, wherein the predetermined backchannel response is a catch phrase.

30. The computer program product of claim 29, further comprising computer readable program code configured to cause the computer to execute a first timing sequence for determining the elapsed time of the speech portion in the audio input.

31. The computer program product of claim 30, further comprising computer readable program code configured to cause the computer to execute a second timing sequence for determining the elapsed time of the non-speech portion in the audio input.

32. The computer program product of claim 31, further comprising computer readable program code configured to cause the computer to randomly select the backchannel response from a plurality of backchannel responses.

33. The computer product of claim 32, further comprising computer readable program code configured to cause the computer to record a voice input of the user.

* * * * *